F. L. BAILEY AND J. H. LA GRANT.
CORE FOR TIRE CASINGS.
APPLICATION FILED MAR. 14, 1921.
1,399,180.
Patented Dec. 6, 1921.
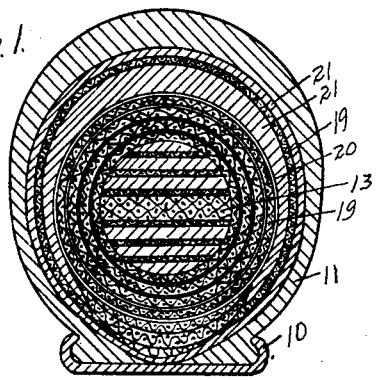
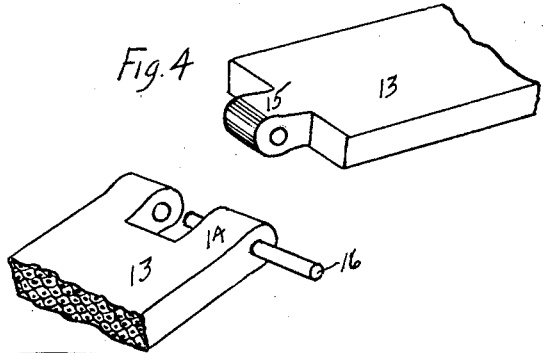
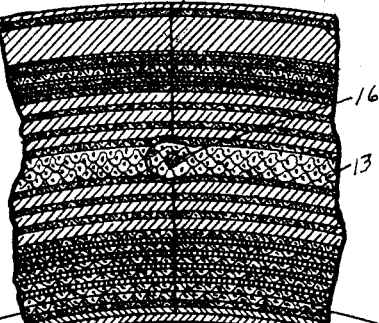
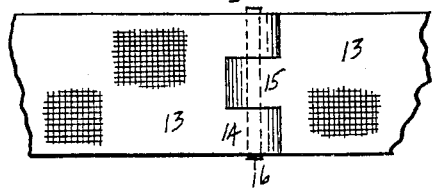
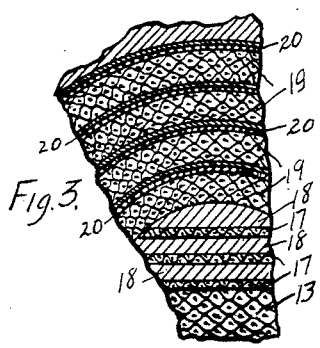
INVENTORS
Fred L. Bailey and John H. La Grant
BY
William C. Edwards Jr.
ATTORNEY

UNITED STATES PATENT OFFICE.

FRED L. BAILEY AND JOHN H. LA GRANT, OF WICHITA, KANSAS.

CORE FOR TIRE-CASINGS.

1,399,180.

Specification of Letters Patent.

Patented Dec. 6, 1921.

Application filed March 14, 1921. Serial No. 452,088.

*To all whom it may concern:*

Be it known that we, FRED L. BAILEY and JOHN H. LA GRANT, citizens, respectively, of Wichita, in the county of Sedgwick and State of Kansas, have invented certain new and useful Improvements in a Core for Tire-Casings, of which the following is a description, referring to the drawings, which accompany this specification.

The core is intended to be used in place of an inner tube within a tire casing in automobile wheel practice and by its structural characteristics give the requisite elasticity to the elements in the combination so that the comfort of the car operator and the wear and tear on car parts will be safeguarded as well as if the air cushion of the customary inner tube type be employed; and at the same time blowouts, punctures and tire accidents in general be entirely overcome.

In the drawings, Figure 1 is a cross-sectional view of our improved core within a tire casing mounted on a rim of an automobile wheel. Fig. 2 is a side elevation of the structure seen in Fig. 1 with a section removed to disclose elements of the core. Fig. 3 is an enlarged fragmentary sectional view of the core parts seen in Fig. 1. Fig. 4 shows the two ends of the fabric belt employed in the manufacture of the core before assembling. Fig. 5 is a top view of the end elements of the belt seen in Fig. 4 as pinned together. Similar numerals of reference indicate corresponding parts in all the figures of the drawings.

Referring to the drawings, 10 represents a rim for an automobile wheel. 11 a tire casing. Within the area of the casing 11 is seen our core comprising rubber, wire and fabric elements in vulcanized homogenity as illustrated. The core is made as one long piece and the ends are made to butt together as at 12 Fig. 2. In the center of the core is a fabric strap or belt 13 having its end 14, 15 arranged as a hinge with a pin 16 adapted to act as a connection therebetween to connect the abutting core ends as at 12. The strap 13 together with alternating layers of fabric 17 and rubber 18 form a central element to the core of circular cross-section and serve to connect and prevent the core elements from sidewise distortion; fabric 19 and wire 20 are alternately wrapped around the central core element and enveloped within rubber outer coverings 21, the whole as stated being vulcanized as a unit and adapted to act as such. The advantage of our improved core or tire filler lies in the fabric elements resisting side distortion, the fabric, wire and rubber cylindrical wrappings insuring resilient coaction of the elements involved under loadings, and in the hinge or end locking arrangement of the composite elements of the combination.

Such modifications may be employed as lie within the scope of the appended claims.

Having fully described our invention what we now claim as new and desire to secure by Letters Patent is:

1. A core for tire casings comprising a central element surrounded by alternating layers of fabric and wire wrappings, said central element including a fabric belt in parallelism with other fabric and rubber members.

2. A core for tire casings comprising a longitudinally extending fabric strap having ends arranged so as to permit of joining when brought together in manner specified, fabric layers in parallelism with said fabric belt and separated therefrom but united therewith by vulcanized rubber elements integral therewith and alternating wrappings of fabric and wire surrounding the aforementioned strap and fabric elements, the whole being vulcanized within rubber as a unit mass.

FRED L. BAILEY.
JOHN H. LA GRANT.

Witnesses:
R. W. ESTEP,
W. A. NETHERCOT.